United States Patent [19]

Hayasaka et al.

[11] 4,130,024

[45] Dec. 19, 1978

[54] SLIDING MEANS FOR PRECISION MACHINERY

[75] Inventors: Toshimi Hayasaka, Hino; Toshikazu Nakajima, Ina, both of Japan

[73] Assignee: Olympus Optical Co., Ltd., Tokyo, Japan

[21] Appl. No.: 809,415

[22] Filed: Jun. 23, 1977

[30] Foreign Application Priority Data

Jun. 30, 1976 [JP] Japan .............................. 51-85158[U]

[51] Int. Cl.$^2$ ............................................. F16H 19/04
[52] U.S. Cl. ....................................................... 74/29
[58] Field of Search .............................. 74/29, 31, 422

[56] References Cited

U.S. PATENT DOCUMENTS

| | | | |
|---|---|---|---|
| 276,206 | 4/1883 | Wilson | 74/31 |
| 1,191,695 | 7/1916 | Hartley | 74/31 |
| 2,429,696 | 10/1947 | Merkt | 74/422 |
| 3,585,875 | 6/1971 | Adams | 74/29 |

Primary Examiner—James C. Mitchell
Attorney, Agent, or Firm—Cushman, Darby & Cushman

[57] ABSTRACT

A sliding means for precision machinery comprising a rack mounted to a moving part and a pinion mounted to a fixed part and meshing with the rack. The sliding means for precision machinery has contact surfaces provided to both of the rack and pinion and arranged to be always kept in contact with each other so that intermeshing of the rack and pinion can be adjusted quite easily.

5 Claims, 3 Drawing Figures

SLIDING MEANS FOR PRECISION MACHINERY

BACKGROUND OF THE INVENTION (a) Field of the Invention

The present invention relates to a sliding means for precision machinery and, more particularly, to a sliding means for moving, for example, a condenser lens of a microscope upward and downward.

(b) Description of the Prior Art

Known sliding means used in precision machinery such as microscopes comprise a pinion mounted to a fixed part, which is fixed to the microscope body, and a rack fixed to a moving part which for example supports the condenser and are arranged to rotate the pinion shaft so that the pinion is rotated and the rack meshing with the pinion is moved upward and downward to move the moving part, i.e., the condenser upward and downward. In case of the above-mentioned known sliding means, however, it is necessary to adjust the rack so that the rack teeth mesh with the pinion teeth on their pitch circles. For this adjustment, metal foils are usually inserted between the moving part and rack in order to adjust the inclination of rack when mounting the rack to the moving part. But, this adjustment is considerably difficult.

SUMMARY OF THE INVENTION

It is, therefore, a primary object of the present invention to provide a sliding means for precision machinery comprising a rack and pinion in which a pinion shaft is supported by a plate spring and contact surfaces contacting each other are provided near the rack teeth and pinion teeth so that the intermeshing condition of rack teeth and pinion teeth can be adjusted easily.

DETAILED DESCRIPTION OF THE PREFERRED EMBODIMENT

Figure 1:
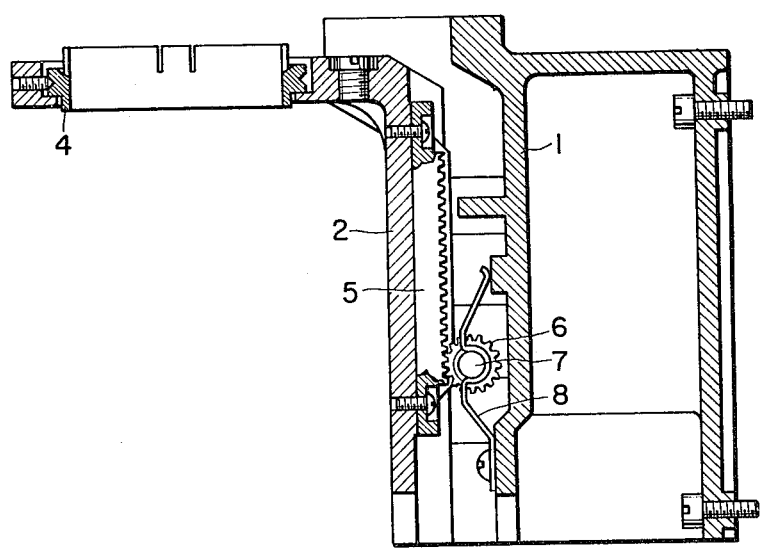
FIG. 1 shows a sectional view of the sliding means according to the present invention.
Figure 2:
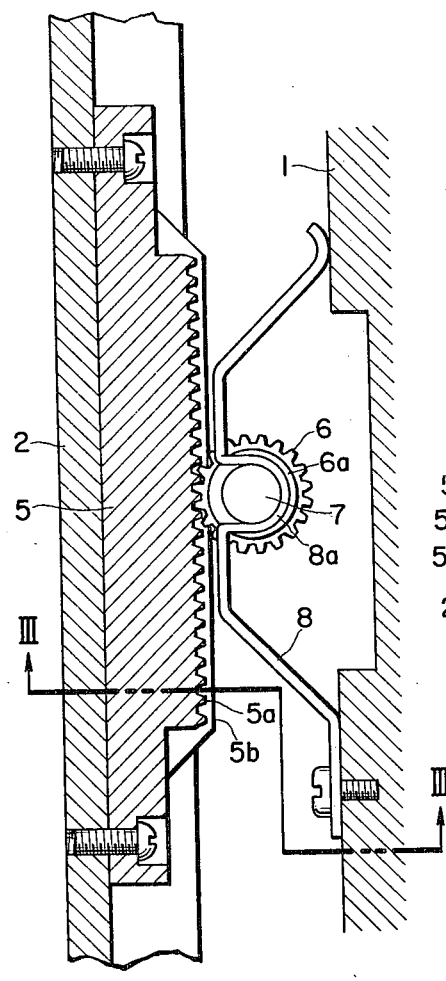
FIG. 2 shows an enlarged sectional view showing the important portion of the sliding means according to the present invention.
Figure 3:
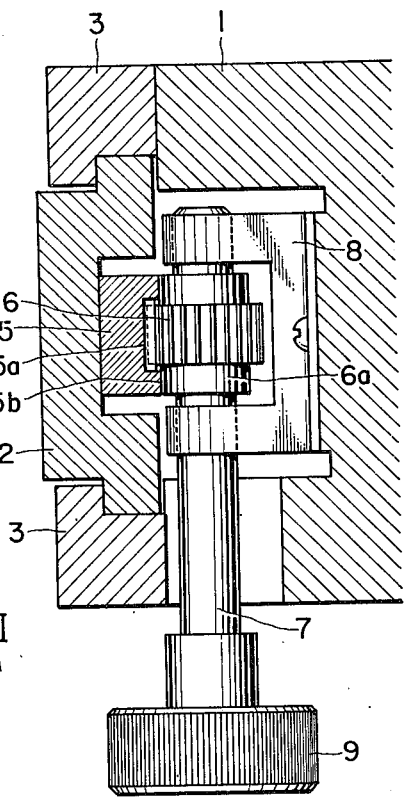
FIG. 3 shows a sectional view taken along the line III—III in FIG. 2.

Concrete construction of a preferred embodiment of the sliding means according to the present invention is as described below. In FIGS. 1 through 3, numeral 1 designates a fixed part fixed for example to the microscope body. Numeral 2 designates a moving part arranged so that it can be slided upward and downward along the guide 3, which is mounted to the fixed part 1. At the top of the moving part 2, a condenser holder 4 is mounted to hold a condenser or the like. Numeral 5 designates a rack fixed to the moving part 2 and having a C-shaped cross section and rack teeth 5a formed along its indented portion. Numeral 6 designates a pinion which meshes with the rack 5. On both sides of the pinion 6, contact surfaces 6a having a diameter smaller than the diameter of the pinion 6 are formed at such positions where those contact surfaces 6a are kept in contact with contact surfaces 5b of the rack 5 which are formed on both sides of rack teeth 5a. Numeral 7 designates a pinion shaft. Numeral 8 designates a plate spring having one end fixed to the fixed part 1 by a screw. In the middle portion of the plate spring 8, concave portions 8a are formed to accommodate the pinion shaft 7. The plate spring 8 acts to push the pinion shaft 7, which is inserted to its concave portions 8a, toward the rack 5. Therefore, the pinion 7 is arranged so that it is inserted to and supported by the concave portions 8a of the plate spring 8 and, at the same time, so that the pinion 6 meshes with the rack 5 by the force of the plate spring 8. Numeral 9 designates a knob fixed to the pinion shaft 7.

Now, the function of the sliding means according to the present invention having the above-mentioned construction is described below. When, for example, moving the condenser mounted to the condenser holder 4 upward and downward, the knob 9 is rotated to rotate the pinion 6 through the pinion shaft 7. As the pinion 6 is rotated, the rack 5 meshing with the pinion 6 moves upward and downward together with the moving part 2. Consequently, the condenser is moved upward and downward as the moving part 2 slides along the guide 3. In the above-mentioned movement, the pinion is meshed with the rack by pushing the pinion shaft 7 toward the rack by the plate spring 8. If, therefore, the force of the plate spring 8 is directly applied to the teeth of the rack 5 and pinion 6, the pinion teeth will be excessively pushed against the rack teeth because of the load in radial direction of the pinion and, consequently, smooth intermeshing of teeth cannot be attained. However, in the sliding means according to the present invention, the rack 5 has contact surfaces 5b on both sides of rack teeth 5a and the height of contact surfaces 5b from the bottom land of rack teeth 5a is larger than the whole depth of rack teeth 5a. Besides, contact surfaces 6a are formed on both sides of the pinion 6 and the radius of the contact surfaces 6a is smaller than the radius of the addendum circle of the pinion 6. The sliding means according to the present invention is arranged so that the contact surfaces 6a are always kept in contact with the contact surfaces 5b so that the pinion 6 properly meshes with the rack 5, i.e., the teeth of the pinion 6 will not mesh with the teeth of the rack 5 excessively or insufficiently. Therefore, the load in radial direction of the pinion 6 is borne by the contact surfaces 5b which is higher than the teeth 5a of the rack 5 and the contact surfaces 6a which is lower than the teeth of the pinion 6. Consequently, the teeth of the rack 5 and pinion 6 always intermesh properly and the moving part 2 is always moved smoothly by a uniform and adequate force. Shapes of contact surfaces are not limited to the above-mentioned shapes. It is of course possible to form contact surfaces, which are lower than the rack teeth, on both sides of the rack teeth and to form contact surfaces, which are higher than the pinion teeth, on both sides of the pinion so that those contact surfaces contact each other.

As described in the above, the sliding means for precision machinery according to the present invention has simple construction in which it is only arranged so that the pinion is pushed toward the rack by the plate spring and, moreover, assures proper intermeshing of the rack and pinion by means of contact surfaces on the rack side and pinion side without requiring precise adjustment of the rack.

We claim:

1. For precision machinery which includes a body having a fixed part fixed thereto and a movable part slidable along a guide mounted to said fixed part,
a sliding means, comprising:

(a) a rack fixed to said moving part and having a row of rack teeth extending thereon lengthwise thereof;

(b) a pinion journalled for rotation on said fixed part and having a row of pinion teeth extending thereon circumferentially thereof;

(c) said pinion being meshed with said rack;

(d) said rack including a first contact surface means extending lengthwise thereof near said rack teeth;

(e) said pinion including a second contact surface means extending circumferentially thereof near said pinion teeth;

(f) said first contact surface means being constantly in sliding contact with said second contact surface means;

(g) the spatial disposition of the first contact surface means relative to said rack teeth and the spatial disposition of the second contact surface means relative to the pinion teeth being such that said first and second contact surface means perform a substantial bearing function and limit the pinion teeth from meshing so deeply between the rack teeth as they could were the first and second contact surface means not provided.

2. The sliding means of claim 1, further including:

a plate spring interposed between said pinion and said fixed part, journalling said pinion on said fixed part and resiliently pressing said pinion toward said rack, so that said plate spring tends to move deeply enmesh the pinion and rack while the first and second contact surface means limit the depth of such enmeshment.

3. The sliding means of claim 1, wherein:

the first contact surface means includes a pair of laterally spaced contact surfaces;

the second contact surface means includes a pair of laterally spaced contacted surface;

the respective individuals of said first contact surfaces being in said constant sliding contact with the respective individuals of said second contact surfaces.

4. A sliding means for precision machinery according to claim 3, in which the height of said contact surfaces of said rack is larger than the height of rack teeth and the radius of said contact surfaces of said pinion is smaller than the radius of dedendum circle of said pinion.

5. A sliding means for precision machinery according to claim 3, in which the height of said contact surfaces of said rack is smaller than the height of rack teeth and the radius of said contact surfaces of said pinion is larger than the radius of addendum circle of said pinion.

* * * * *